UNITED STATES PATENT OFFICE
PTO – BOYERS, PA DUTY STATION

---

PAGE NOT AVAILABLE

PATENT NUMBER X2953 FOR THE ISSUE DATE 5/27/1818 HAS BEEN SCANNED/LOADED, BUT WITH MISSING PAGE(S). UPON RECEIPT OF THE MISSING PAGE(S), THE ENTIRE DOCUMENT WILL BE RESCANNED. THIS NOTICE IS FOR THE MISSING PAGE CONTAINING:

Missing ALL Drawings

DATA CONVERSION OPERATION
BOYERS, PA

X2953 5-27-1818 461

Gideon Davis

Letters Patent. May 27. 1818.

The schedule referred to in these Letters Patent and making part of the same containing a description in the words of the said Gideon Davis himself of his improvement in the Plough.

My Improvements consist of 1st. The plough is made entirely of wrought iron except the mould plate which is made of cast iron and the handles or part which the ploughman takes hold of, they are made of wood, 2d, This plough is made of sufficient strength without being cumbersome and heavy, chiefly in consequence of the beam being made of two pieces of iron the principal one being about 3 inches deep. 5/8 inch thick near the middle or largest part, and tapered to a proper size at each end. The other part or brace is from 5/8 to 7/8 of an inch in thickness and about 1½ inch in width from end to end.

These two parts are joined together with about 6 screw bolts passing through the brace and beam, with 4 or 5 thimbles or regulators to keep them in their proper places. The brace near the middle is about 3 or 4 inches distant from the beam, with a coulter mortice attached to the brace in the inside, This mode of placing the coulter with its top leaning over the land has a tendency to detach the furrow with more ease, and throw it from the land side; this with the manner of fastening it hereafter to be described, I deem a singular advantage over the common mode.

4th. The coulter is fastened by means of an iron rod, with a broad hook, which catches on the shank of it, here [illegible] the brace; and passing through a thimble attached to the shank with a thumb screw. The advantage of this is that it keeps the coulter perfectly steady, without wedging except. only at the sides 5th. I use a chain or rod, passing from the main bolt in the beam, to the end of the round, or near the top of the right hand stilt. This answers two good purposes. It braces the stilt, and bears the line up, so as not to be caught under the furrow.

6th. I make use of a bow, passing between the stilts at about 9 or 10 inches from the top or round, and attached to the upper round in the middle by a rivet.

X2953

7. The shear is made pretty much in the usual form, but without a socket, in lieu of which, I cut through the plate, and turn up an ear, about 3/4 or one inch high, which coming against the side of the sheath, keeps it equally steady as if there were a socket.

8. The mould plate is attached to its stilt, by two or more screw bolts and to the brace which passes from the sheath near the shear to the main bolt by the side of the coulter mortice by one screw bolt near the sheath, 9. I place my false coulter between the mould plate and the braces which also assists in keeping the plough clean.

10. I fix my clevis in such a manner, as to be able to give the plough more or less depth of land.

11. The left hand or land stilt is fastened to the beam by two or more screw bolts, by which the land of the plough is regulated 12. Though I have here given certain proportions, yet these may be varied to suit the fancy of the farmer, without materially altering the principle of my improvements.

Witnesses

Wm. Yealey

Wm. Elliot

Gideon Davis

[illegible]

Exd

Copd